UNITED STATES PATENT OFFICE.

HENRY A. GARDNER, OF WASHINGTON, DISTRICT OF COLUMBIA.

FUMIGANT PAINT.

1,373,499.  Specification of Letters Patent.  Patented Apr. 5, 1921.

No Drawing.   Application filed December 27, 1920.   Serial No. 433,396.

*To all whom it may concern:*

Be it known that I, HENRY A. GARDNER, a citizen of the United States, residing at Washington, in the District of Columbia, have invented certain new and useful Improvements in Fumigant Paint, of which the following is a specification.

This invention is a novel composition having insecticidal, fungicidal and bactericidal properties due to the presence therein of one or more volatile chlorinated derivatives of benzol, specifically o-dichlorbenzol.

Commercial o-dichlorbenzol is a clear, almost colorless, chemically stable liquid, which is miscible with most paint and varnish vehicles. It occurs as a principal component of the mother liquor from which p-dichlorbenzol has been crystallized out, and this mother liquor, with or without further purification or rectification, is included in the term "commercial o-dichlorbenzol" as employed herein. The mother liquor may contain in addition to o-dichlorbenzol, varying amounts of p-dichlor and monochlor benzol, and possibly some meta-dichlorbenzol and even trichlorbenzol. A typical sample of the material showed the following characteristics:

Appearance: Clear and free from suspended matter.
Color: Faint straw yellow.
Odor: Penetrating.
Specific gravity by hydrometer: 1.270 at 60° F.
Spot test on paper after 30 minutes: No stain left.
Flash point (Tagliabue closed cup): 121° F.
Initial boiling point: 140° C.
Final boiling point: 183° C.
98% distils between 140° C. and 183° C.
2% residue gives neutral reaction.

*Distillation percentages.*

| | |
|---|---|
| 140°–150° C | 3% |
| 150°–160° C | 22% |
| 160°–170° C | 27% |
| 170°–183° C | 46% |
| | 98% |

Commercial o-dichlorbenzol is miscible with practically all liquids employed in paint and varnish manufacture, including drying and other oils, naphthas, turpentine, etc. In a series of tests with heavy bodied oils and resins the following results were obtained, indicating the minimum proportion of commercial o-dichlorbenzol which may be added without involving separation:

| Heavy-bodied linseed, 1 part. | Rosin, 1 part. | Damar-Batavia, 1 part. | Kauri No. 1, 1 part. | Copal-Kongo, 1 part. | #1 ordinary Ponti-anak, 1 part. | Bold pale East India, 1 part. |
|---|---|---|---|---|---|---|
| Soluble in 1 part o-dichlorbenzol. No separation by dilution. | Soluble in 1.5 parts o-dichlorbenzol. No separation by dilution. | Soluble in 1.5 parts o-dichlorbenzol. No separation by dilution. | Swells and softens. | Swells and softens. | Insoluble. | Soluble in 1.5 parts o-dichlorbenzol. No separation by dilution. |

According to the present invention chlorinated benzol is employed in sufficient proportions as a component of paint or varnish compositions to impart thereto the desired fumigant properties, this term being used to indicate an insecticidal, bactericidal or fungicidal effect.

In the preferred embodiment of this invention my novel composition comprises a pigment which is preferably white; a film-forming bonding substance such as linseed, tung or other drying oil; and o-dichlorbenzol, with or without other solvents or thinners. Such compositions can be employed without risk to human life or health, and are of great utility for many purposes, more particularly as wall paints for the interior of warehouses and other storage plants or receptacles where vast damage is now suffered through the ravages of insects and other pests, vermin, etc.

As a typical illustrative example of the invention, a paint composition was prepared as follows:

100 parts of a white opaque pigment comprising 70% of lithopone and 30% of magnesium silicate were compounded with 50 parts of a vehicle comprising 30% of bonding agent (linseed or treated tung oil), 40% of thinner (as mineral spirits or turpentine) and 30% of commercial o-dichlorbenzol. The resulting paint was applied to wood, and was tested for its efficacy as an insecticide. Cockroaches confined in proximity to the freshly painted surfaces were killed within ten minutes, while others were practically unaffected by one hundred minutes' confinement in proximity to similar freshly painted surfaces in which the o-dichlorbenzol had been substituted by mineral spirits and turpentine respectively. Fungicidal and bactericidal tests indicate similar efficacy for the o-dichlorbenzol composition.

It will of course be understood that the composition of the paint or varnish may be widely varied without departure from my invention, according to the specific purpose for which it is intended. The composition may be spread by brush or spray over the wall areas of warehouses, or the interior surfaces of cupboards, drawers, closets or other confined spaces not usually painted but often over-run by vermin or insects. The chlorinated benzol derivative is evolved gradually during the drying process, asserting its insecticidal effect. The drying of the paint is not retarded and the dried film is hard, white, clean, light-reflecting and durable. When applied to yellow pine, cypress and other structural woods the present compositions exhibit a superior penetration, indicating their applicability as a priming coat for all paints applied to wood-work.

For special applications in which a pigment is not desired, this may be omitted, the corresponding proportion of o-dichlorbenzol being introduced for example into known or desired varnish compositions, usually in replacement of a corresponding quantity of volatile solvent or thinner. But in the preferred embodiment of my invention I include in the composition the pigment and the bonding agent therefor.

As already stated, my preferred fumigating component for these coating compositions is o-dichlorbenzol or the commercial liquid product containing the same, not only by reason of the excellent fumigant properties of this compound, but because of its efficacy as a solvent. Nevertheless my invention is not limited thereto in its broader aspects, since similar results may be obtained by substituting o-dichlorbenzol wholly or in part by other chlorinated benzol derivatives, as p-dichlorbenzol and monochlorbenzol. P-dichlorbenzol, in a state of purity, is a soluble solid of high volatility even at ordinary temperatures, and may be incorporated in any preferred paint or varnish composition.

In cases where a very light color is not required, a highly efficient bonding agent for the pigment component of these paints is the so-called dechlorinated mineral oil, of the type disclosed in application Serial No. 343,458, filed Dec. 9, 1919, Gardner and Bielouss, or combinations thereof with tung oil.

I claim:

1. A fumigant coating composition containing a chlorinated benzol derivative.
2. A fumigant coating composition containing a di-chlorinated benzol derivative.
3. A fumigant coating composition containing o-dichlorbenzol.
4. A fumigant paint composition containing a pigment, a film-forming bonding substance, and a chlorinated benzol derivative.
5. A fumigant paint composition containing a pigment, a film-forming bonding substance, and a di-chlorinated benzol derivative.
6. A fumigant paint composition containing a pigment, a film-forming bonding substance, and o-dichlorbenzol.

In testimony whereof, I affix my signature.

HENRY A. GARDNER.